United States Patent [19]
Santini

[11] Patent Number: 5,901,431
[45] Date of Patent: May 11, 1999

[54] METHOD OF FABRICATING A THIN FILM INDUCTIVE HEAD HAVING A SECOND POLE PIECE HAVING A MUSHROOM YOKE PORTION

[75] Inventor: Hugo Alberto Emilio Santini, San Jose, Calif.

[73] Assignee: International Business Machines Corporation, Armonk, N.Y.

[21] Appl. No.: 08/733,952

[22] Filed: Oct. 17, 1996

Related U.S. Application Data

[62] Division of application No. 08/486,463, Jun. 7, 1995, abandoned.

[51] Int. Cl.⁶ .................................................. G11B 5/127
[52] U.S. Cl. ................................. 29/603.14; 29/603.15; 29/603.16; 216/22; 360/126
[58] Field of Search ............................ 29/603.14, 603.15, 29/603.16, 603.18, 603.26; 216/22, 47, 48; 360/113, 119, 122, 125, 126

[56] References Cited

U.S. PATENT DOCUMENTS

| | | | |
|---|---|---|---|
| 4,727,643 | 3/1988 | Schewe et al. | 29/603.14 |
| 4,933,209 | 6/1990 | Anthony et al. | 29/603.26 X |
| 4,992,901 | 2/1991 | Keel et al. | 29/603.14 X |
| 5,045,961 | 9/1991 | Kobayashi et al. | 29/603.14 X |
| 5,068,959 | 12/1991 | Sidman | 29/603 |
| 5,084,957 | 2/1992 | Amin et al. | 29/603.14 |
| 5,184,394 | 2/1993 | Hsie et al. | 29/603 |
| 5,241,440 | 8/1993 | Ashida et al. | 360/126 |
| 5,282,308 | 2/1994 | Chen et al. | 29/603 |
| 5,298,459 | 3/1994 | Arikawa et al. | 437/183 |
| 5,375,023 | 12/1994 | Ju et al. | 360/119 |
| 5,462,637 | 10/1995 | Thiele | 216/22 |
| 5,580,602 | 12/1996 | McKean et al. | 29/603.14 X |
| 5,649,351 | 7/1997 | Cole et al. | 29/603.18 X |
| 5,653,013 | 8/1997 | Gill et al. | 29/603.15 X |

FOREIGN PATENT DOCUMENTS

| | | | |
|---|---|---|---|
| 88517 | 6/1982 | Japan | 29/603 |
| 162115 | 10/1982 | Japan | 29/603 |
| 112415 | 6/1984 | Japan | 29/603 |
| 62-88114 | 4/1987 | Japan . | |

Primary Examiner—Peter Vo
Attorney, Agent, or Firm—Paik Saber

[57] ABSTRACT

A method is disclosed for fabricating a high density recording head having a narrow, well-defined second pole tip for recording data with an areal density in the range of 5 gigabits. The second pole tip is connected to a mushroom yoke which extends across underlying insulated coils. The second pole tip and yoke are formed at the same time using conventional photolithographic and plating processes. By using a preselected thickness for the photoresist mask layer over the head body region, an aspect ratio for the photolithographic process of less than 4:1 is achieved in the head pole tip region. However, the thickness of the photoresist mask layer in the head body/yoke region will be less than the desired thickness of the second pole piece, which creates a problem of a void beneath mushroomed overhanging edges. By back-filling the void with an insulating material at the time the head is sealed, the void problem is overcome.

4 Claims, 8 Drawing Sheets

METHOD OF FABRICATING A THIN FILM INDUCTIVE HEAD HAVING A SECOND POLE PIECE HAVING A MUSHROOM YOKE PORTION

This application is a divisional application of Ser. No. 08/486,463, filed on Jun. 7, 1995, now abandoned.

PRIOR ART RELATED APPLICATIONS

Pending application entitled, "Low Profile Thin Film Write Head," Ser. No. 08/296,301, filed Aug. 25, 1994 now abandoned, is incorporated herein in its entirety by reference. This co-pending application is related to this application through common inventorship.

BACKGROUND OF THE INVENTION

1. Field of the Invention

This invention relates to magnetic transducers particularly applicable to magnetic disk drive systems. More particularly, the invention relates to devices and methods of manufacturing thin film inductive heads having a narrow pole tip for high density data transfer in a magnetic disk drive system.

2. Description of the Related Art

Thin film magnetic read/write heads are used for reading and writing magnetically coded data stored on a magnetic storage medium such as a magnetic disk or a magnetic tape. There is a continuing strongly-felt need for increasing the data storage density in such media. Most efforts to increase magnetic storage density involve techniques for increasing the areal bit density in the magnetic medium.

In rotating magnetic disk drives, the areal density is the product of the number of flux reversals per millimeter along a data track and the number of tracks available per millimeter of disk radius. Thus, high areal data storage density requires recording heads with high linear resolution and narrow track width.

A thin film recording head includes first and second pole pieces which are magnetically coupled together at a pole tip region and at a back gap. In the pole tip region, the first and second pole pieces provide first and second pole tips which are separated by a thin non-magnetic gap layer. The thickness of the gap layer between the second pole tip and first pole tip and the configuration of the second pole tip are the most crucial elements in thin film write heads. The thickness of the gap layer at the head air bearing surface determines the linear density of the head, namely how many bits per linear unit length along a data track of a magnetic medium the head can write. The width of the second pole tip determines head track width, which establishes how many data tracks across the width of a magnetic medium per unit length can be written by the head. The product of these two factors is areal density. One factor in increasing areal bit density is achieving a narrow track width second pole tip.

In one method of fabrication, a second pole tip is constructed individually and then the remainder of the second pole tip piece is "stitched" to the second pole by ordinary photolithography as described in U.S. Pat. No. 5,282,308 issued Feb. 1, 1994, and assigned to the same assignee as that of the present invention. In another process the second pole tip and the second pole piece are plated simultaneously in the same process step. However, prior art methods of constructing the second pole piece and the second pole tip with the same process steps have not provided a high resolution second pole tip. When the second pole piece and the second pole tip are constructed simultaneously by ordinary photolithography, a photoresist layer is spin-coated over the body portion and the pole tip region of the head to provide a plating mask. The photoresist layer is located above a gap layer in the pole tip region and above a stack of insulation/coil layers in the body, i.e., the coil region of the head. The insulation stack is typically 7–8 microns ($\mu$m) thick above the gap layer and has a marked slope as the first insulation layer transitions to its apex or the point where the slope ends. Since photoresist is applied on a wafer by spin-coating, it partially planarizes across the body portion and the pole tip region causing the photoresist over the pole tip region to be considerably thicker than the photoresist over the body portion of the head. The thickness of the photoresist in the body portion of the head is dictated by the desired plated metal thickness of the second pole piece. For example, if the second pole piece in the body portion is to be 4 $\mu$m thick, the photoresist layer would have to be approximately 4.5 $\mu$m thick to properly encapsulate the entire height of the plated material. With a typical insulation stack height of about 8 $\mu$m, this results in a photoresist layer that could be as thick as 12.5 $\mu$m in the pole tip region. This photoresist thickness in the pole tip region plus the steep slope of the first insulation layer near the pole tip region makes it very difficult to construct a narrow track width second pole tip with subsequent photolithography steps. After the photoresist layer is deposited, it is patterned by exposure to light in one or more areas which are to be removed by a subsequent step of dissolving the exposed photoresist. Because of the thickness of the photoresist in the pole tip region, the intensity of the light for patterning has to be high in order to penetrate the full depth of the photoresist. When the intensity of the light is high, the narrow slits in the mask employed for patterning miniature features in the photoresist introduce diffraction of the exposure light at the edges of the slits. This results in poor resolution. A more serious problem, however, is the reflection of light into the pole tip region from the sloping insulation layers behind the pole tip region. The reflection causes notching of the photoresist layer resulting in poor definition of the pole tip. Plating after this type of patterning results in a second pole tip with irregularly shaped sidewalls and a poorly defined width.

In a viable manufacturing process for making high resolution thin film heads, the aspect ratio, which is the thickness of the photoresist layer in the pole tip region with respect to the track width (i.e, the width) of the pole tip, should be less than about 4 to 1 using conventional photolithographic processes. Experience indicates that in a data recording head for one gigabit areal density recording, the pole tip width should be 3 $\mu$m which limits the photoresist thickness to 12 $\mu$m or less. A recording head for two gigabits requires a pole tip width of 1.8 $\mu$m with the photoresist thickness less than 7.2 $\mu$m. A recording head for 5 gigabits has been found to have a pole tip width of 0.9 $\mu$m with a photoresist less than 3.6 $\mu$m.

It is apparent that a maximum aspect ratio of 4 to 1 cannot be maintained for high density recording heads in the gigabit range using conventional photolithographic processes when a photoresist layer planarizes to a greater thickness over the second pole tip than over the body region.

Accordingly, a solution for reducing the aspect ratio in a process which constructs the second pole tip at the same time the second pole piece in the body region is constructed is needed which will make available high density recording heads in the gigabit range using conventional photolithic processes.

SUMMARY OF THE INVENTION

An object of the invention is to provide a well-defined narrow second pole tip simultaneously formed with a second pole piece.

Another object is to provide a preselected photoresist thickness at a second pole tip region for patterning a second ferromagnetic element of a high density, thin film inductive head.

Another object is to provide a high density inductive head having a flared second pole piece integral with a narrow, well-defined second pole tip.

Another object is to provide a method of fabricating a high density inductive recording head having a flared second pole piece formed simultaneously with a narrow, well-defined second pole tip.

A feature of the invention includes selecting a photoresist of a thickness sufficient to cover the plated thickness of a second ferromagnetic element pole tip while allowing the photoresist to be thinner over other regions of the head such as the body region.

Another feature is depositing a plated second pole piece to mushroom over a relatively thin photoresist layer in the body region of the head.

Another feature uses the second ferromagnetic element anneal cycle to cross-link a layer of photoresist material and seal any voids under a mushroomed second pole piece in the body region.

In one embodiment a first ferromagnetic element is deposited on a substrate to form a first magnetic pole piece including a front pole tip area and a back region area having a back-gap portion. A gap-forming layer of non-magnetic material is disposed on the first ferromagnetic element. The gap-forming layer extends the length of the first ferromagnetic element, except for the back-gap portion. A photoresist layer is deposited over the gap-forming layer and cross-linked or densified (sometimes referred to as "herd baking"), i.e., increasing the density of the deposited material by increasing the lengths of the polymer chains, to form a first insulating layer. The first insulating layer is disposed on the gap-forming layer between the front pole tip and the back-gap portion, and slopes toward an apex at the front pole tip and at the back-gap portion and forms a substrate for subsequent plating of a coil for generating a magnetic field. A second insulating layer is formed to enclose the coil by depositing a photoresist layer thereover and crosslinking. The second insulating layer is formed within the apexes of the first insulating layer. A third insulating layer is disposed within the apexes of the second layer and cross-linked to serve as a flat surface for an electrically conductive seed layer for forming second ferromagnetic element. The seed layer is deposited over the entire head structure including the pole tip region to the back gap region. A photoresist layer is spin-coated over the seed layer and patterned to provide a mask or plating frame over the second pole tip region, the body or yoke region over the coil and the back gap portion. The thickness of the photoresist layer over the head coil region is controlled to be less than the thickness of the plated second ferromagnetic element resulting in a reduced photoresist thickness in the pole tip region. Thus, as a result of the centrifuging action the relatively thin photoresist layer over the coil region allows an aspect ratio of less than 4:1 to be achieved at the pole tip regions. The second ferromagnetic element is formed as a single member over the pole tip, body and backgap regions. The thickness of the second ferromagnetic element is less than the thickness of the photoresist at the pole tip, but greater than the photoresist thickness over the coil region. The second ferromagnetic element at the pole tip region forms a narrow, well-defined second pole tip. In the body region, the second ferromagnetic element mushrooms over the edges of the photoresist mask and extends over the mask layer a small amount. The photoresist, including the photoresist under the second ferromagnetic element mushroomed edges, is then removed to allow removal of the seed layer. A fourth insulating layer is then formed over the third insulation layer and the second ferromagnetic element in the head body region including back filling under the mushroomed edges and cross-linked. As a result of cross-linking an integral wall of insulative material surrounds the second ferromagnetic element.

The above and other objects, features and advantages of the invention will be more clearly understood from the following detailed description, when read in conjunction with the accompanying drawing.

BRIEF DESCRIPTION OF THE DRAWING

FIGS. 3A' and 3B' are cross-sectional views of the second pole piece shown in FIGS. 3A and 3B, respectively, illustrating the preferred embodiment for backfilling;

DETAILED DESCRIPTION OF THE PREFERRED EMBODIMENTS

Figure 1:
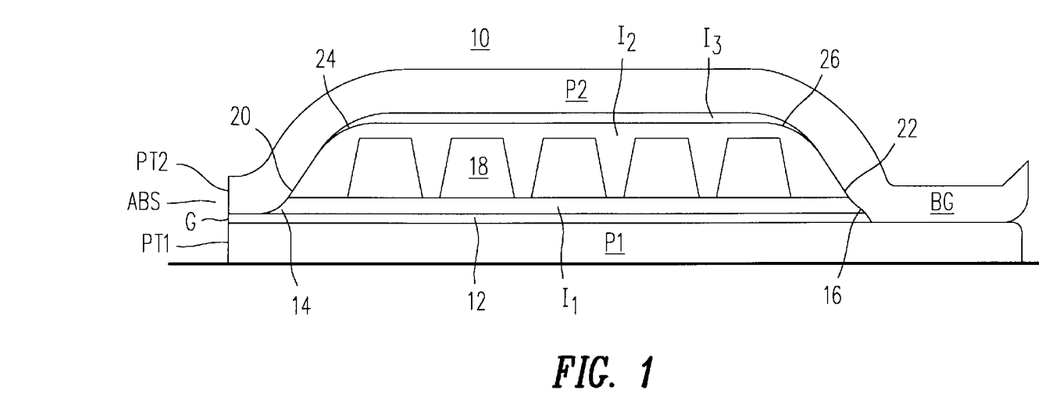
FIG. 1 is a cross-sectional view of an inductive head illustrating the components and structure thereof.

Turning to FIG. 1, a partial cross-sectional view of a typical inductive head 10 having a second pole tip PT2 employing the principles of the present invention is illustrated. The head 10 comprises a first ferromagnetic element or pole piece P1 formed on a substrate (not shown) and including a pole tip region PT1 and a back gap region BG. In one form the element P1 is nickel-iron (NiFe) but other magnetic alloys may be suitable. Overlying the element P1 is a gap layer 12 of a non-magnetic material, typically aluminum trioxide ($Al_2O_3$) or silica ($SiO_2$). The gap layer is formed to a thickness of 0.3 $\mu$m, for example, and extends to the pole tip region PT1. The gap layer 12 terminates at the other end of the ferromagnetic element P1 prior to the gap region BG. A first insulation layer I1 typically photoresist baked in a high temperature polymerization process is formed on the gap layer 12. The insulation layer I1 is approximately 1.5 μm thick and forms an apex 14 at the inward end of the pole tip region PT1. The layer I1 also forms an apex 16 at the end of the gap layer 12 terminating at the back gap. Using conventional photolithographic and chemical vapor deposition or plating processes, one or more layers of coils 18 are formed on the layer I1 and set back from the apex points 14 and 16. A second insulation layer I2, typically hard baked photoresist is formed to a thickness of 1–1.5 μm above the top of the coil and encloses the coils 18. The insulation layer I2 forms apex points 20 and 22 which are within apex points 14 and 16. A third insulation layer I3 is formed on the layer I2 and terminates at apex points 24 and 26 which are within apex points 20 and 22. Again, the insulation layer I3 is formed by depositing a layer of photoresist to a thickness of approximately one μm and hard baking. Alternatively, provided that the second insulation layer I2 provides sufficient insulation, the third insulation layer I3 may be omitted to reduce the height of the insulation/coil stack. A second ferromagnetic element or pole piece P2 is formed over the third insulation layer I3. The second ferromagnetic element P2 extends to the head pole tip region forming a second pole tip PT2 disposed on the gap layer 12 in opposing relationship to the first pole tip PT1. The gap layer 12 is disposed between the two pole pieces PT1, PT2 forming a magnetic transducing gap G. The second ferromagnetic element P2 also extends to the back gap region BG and is disposed over and is magnetically coupled to the first ferromagnetic element in the back gap region.

Figure 2A:
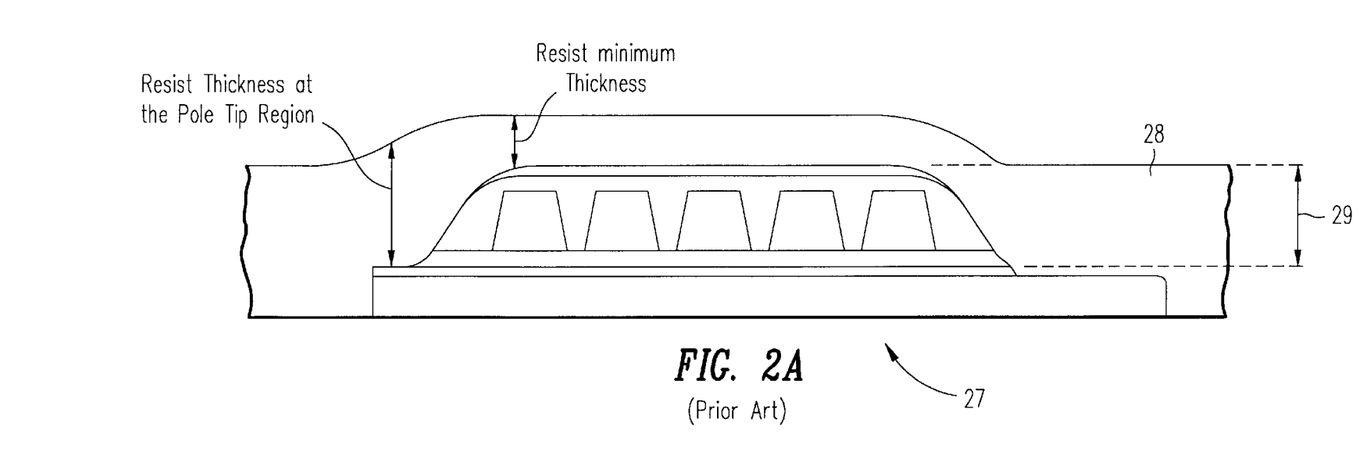
FIG. 2A is a cross-sectional view of a partial inductive head illustrating the second pole piece plating frame mask.
Figure 2B:
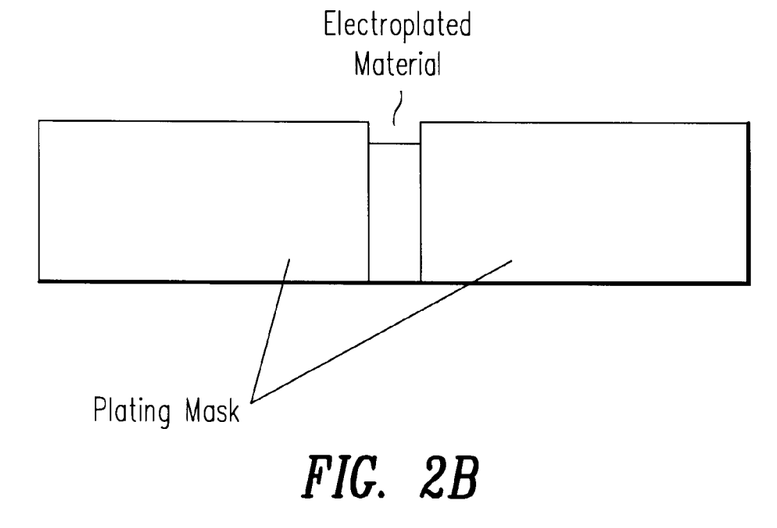
FIGS. 2B and 2C are cross-sectional views illustrating thick and thin plating frame mask layers with respect to a plated member of constant thickness, respectively.
Figure 2C:
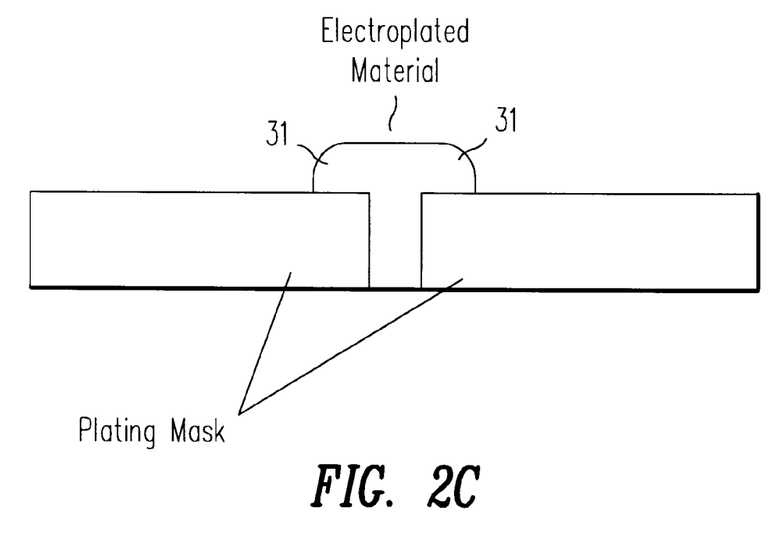

Turning now to FIGS. 2A, 2B and 2C, FIG. 2A illustrates a prior art method for formation of the plating mask for the second pole piece P2 shown in FIG. 1. Photoresist in liquid or semi-liquid form is deposited over the incomplete head structure 27 by a spin-coating process to form a mask layer 28 for the second pole piece P2. Due to the centrifuging action during deposition and the properties of the photoresist being used, the layer 28 of photoresist is self-leveling to form a partially planarized layer over the head structure 27 with the photoresist having its minimum thickness over the head body or coil region and its maximum thickness in the head pole tip region.

The final thickness of the photoresist layer 28 in the head pole tip region is a function of several parameters: (a) the rate of spin-coating; (b) the duration of the spin-coating process; (c) the molecular weight of the photoresist used; (d) the solid/solvent content of the photoresist use; and (e) the rate of evaporation for the solvent. To a lesser degree, the height and contour of the insulation/coil stack also affects the thickness of photoresist layer 28 in the pole tip region.

The mask layer 28 is then patterned using photolithographic techniques to form a plating frame. The minimum thickness for the photoresist mask layer is determined by the desired thickness of the structural component, the second pole piece P2, for example, being plated. In a conventional plating frame, the thickness of the photoresist layer is slightly greater than the thickness of the plated material, as shown in FIG. 2B. For example, if the desired thickness of the plated material is to be 4.0 μm, then the minimum thickness of the photoresist plating frame will be about 4.5 μm to insure a well-defined plated component. However, because the photoresist mask layer 28 is partially planarized across the head structure 27, to provide a minimum thickness of 4.5 μm over the head coil region, the thickness in the pole tip can be as great as 4.5 μm plus the height of the insulation/coil stack 29.

In a head constructed according to the principles of the present invention, the minimum thickness of the second pole piece P2 plating mask is reduced to less than the desired thickness of the plated pole piece. For example, in a preferred embodiment, the minimum thickness of the photoresist plating mask 28 is about 2.5 μm over the head body region thus reducing the photoresist thickness in the head pole tip region by about 2.0 μm. When material is now plated to the desired thickness of 4.0 μm, for example, plated material will fill the slits or channels formed in the mask layer and mushroom ever the edges of the plating mask forming overhanging edges 31 as shown in FIG. 2C. Since the photoresist layer is still relatively thick in the pole tip region, a maximum of about 10.5 μm for a head having an 8.0 μm high head stack, for example, the 4 μm-thick plated material is completely contained within the plating frame thus providing a well-formed pole piece PT2. By reducing the photoresist minimum thickness over the head body region to 2.5 μm for a head having an insulation/coil stack height of about 8 μm and a 3.0 μm second pole tip PT2 width, a plating mask aspect ratio well below the maximum desired aspect ration of 4:1 is obtained.

Figure 3A:
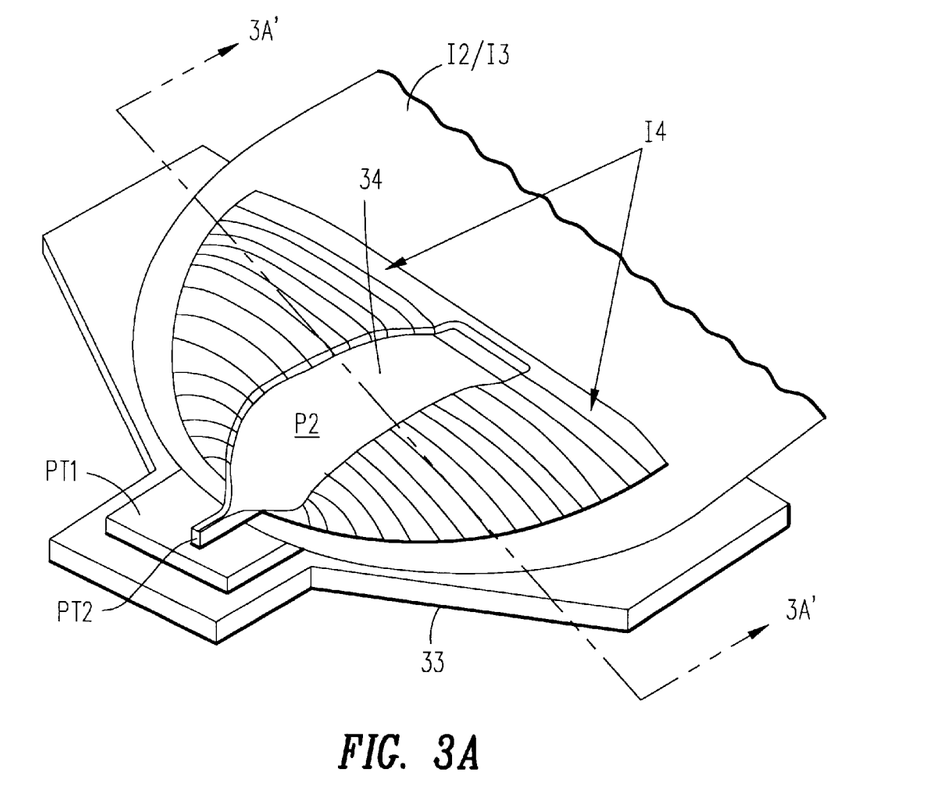
FIGS. 3A and 3B are isometric views of an inductive head illustrating first and second preferred embodiments of the second pole piece, respectively, constructed according to the principles of the present invention.
Figure 3B:
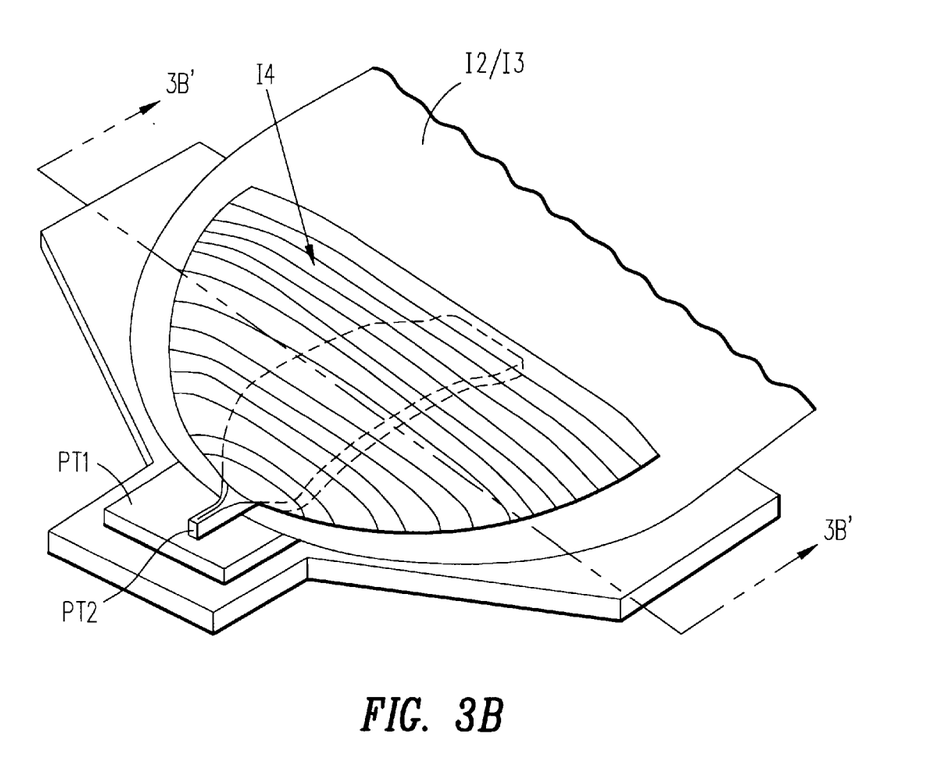
Figure 4A:
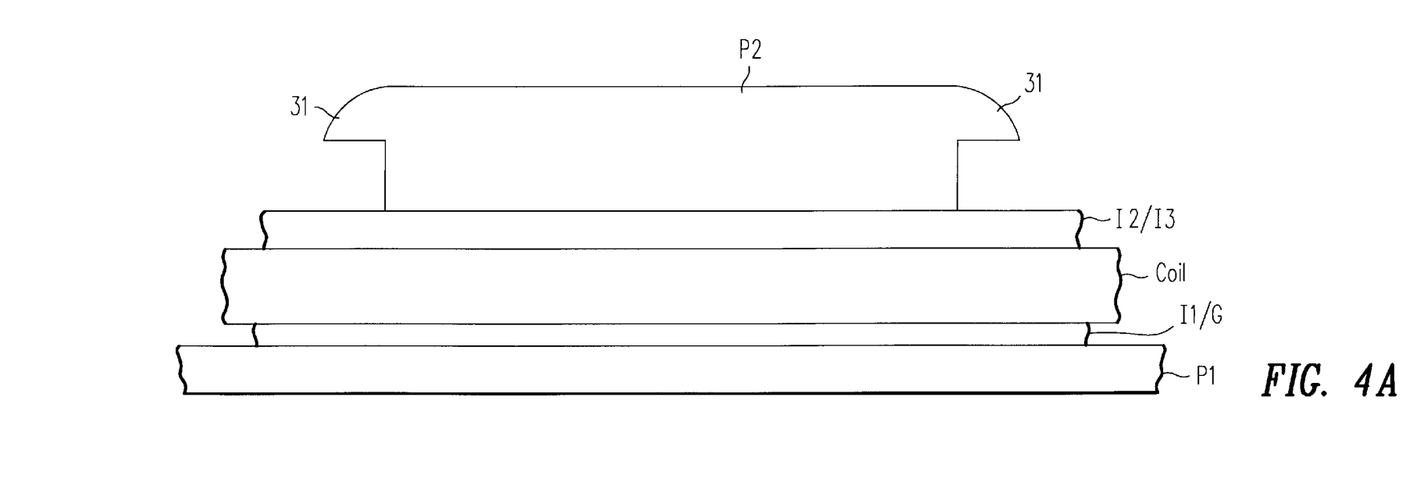
FIG. 4A is a cross-sectional view of the high density head of FIGS. 3A and 3B prior to the formation of insulation layer 14 as shown in FIGS. 3A' and 3B'.

Turning now to FIGS. 3A, 3A', 3B and 3B', first and second preferred embodiments of a magnetic transducer (head) employing a second pole piece P2 constructed according to the principles of the present invention is shown. The first pole piece P1 and the non-magnetic gap layer, inductive coil and various insulation layers are formed on a substrate 33 as described in greater detail in FIGS. 5A–5G below. The substrate 33 may comprise any suitable material and in one preferred embodiment, substrate 33 comprises the second shield layer of a magnetoresistive read head (not shown). The second pole piece P2 and its pole tip PT2 are constructed using a photoresist plating frame wherein the mask layer has a reduced thickness over the head body region as described above with reference to FIGS. 2A–2C. Accordingly, the ratio of the thickness of the photoresist to the thickness of deposited ferromagnetic material will be high at the pole tip region as shown in FIG. 2B and low in the head body coil region as shown in FIG. 2C. As shown by FIG. 4A the plated second pole piece P2 in the head body region 34 (sometimes referred to as the "yoke") extends or mushrooms over the photoresist mask boundaries causing overhanging edges 31 on both sides of the pile piece P2 along its length in the head body region. An overhang does not occur at the pole tip region due to the thickness of the photoresist in that region. The overhang is not desired in the pole tip region because after the head is computed, it is encapsulated in an insulator, for example, aluminum trioxide ($Al_2O_3$) sputter deposited over the entire surface of the device. Because of the overhanging edge and the nature of the sputtering process, there would be voids which would extend to the air bearing surface of the head thereby creating a possible debris collection area.

Figure 4B:
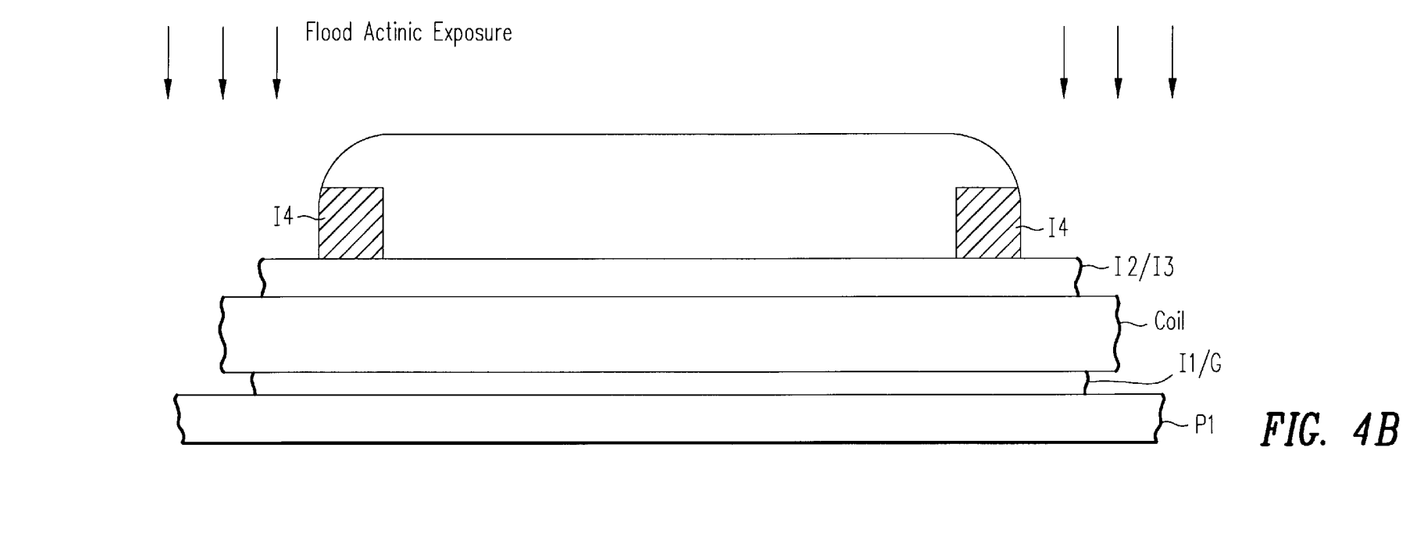
FIG. 4B is a cross-sectional view of another preferred embodiment of the formation of insulation layer 14.

The completed second pole piece P2 appears as shown in FIG. 4A and includes overhang portions 31 which can create reliability problems for the pole piece. The plating mask and underlaying seed layer are removed as is known in the art to provide a completed second pole piece P2. A fourth layer of photoresist is spin coated over the head and patterned to cover the body region of the head only, leaving the pole tip PT2 exposed. Because of its liquid or semi-liquid state, the photoresist will wet all exposed surface and fill in under the overhanging edges 31 thus preventing formation of voids when the head is completed. The photoresist layer I4 may be further patterned to form a partial layer I4 covering only the overhanging edge 31 portions and leaving the center portion of the second pole piece P2 exposed in the head body region 34 (as shown in FIGS. 3A and 3A'). Alternatively, the photoresist layer may form a layer I4' covering the entire second pole piece P2 in the head body region 34 has shown in FIGS. 3B and 3B'). A third alternative as shown in FIG. 4B patterns the fourth photoresist layer using the overhanging edges 31 as a mask to develop the photoresist and provide a photoresist fill layer I4" only under the overhanging edges 31, between the third insulation layer I3 and the bottom side of the overhanging edges. Finally, the pole pieces are subjected to a magnetic annealing process which also cross-links the photoresist layer I4 covering the second pole piece resulting in an integral wall partially or entirely around the yoke 34.

A more detailed description for fabricating an inductive head 50 will now be described in conjunction with FIGS. 5A–5G.

Figure 5A:
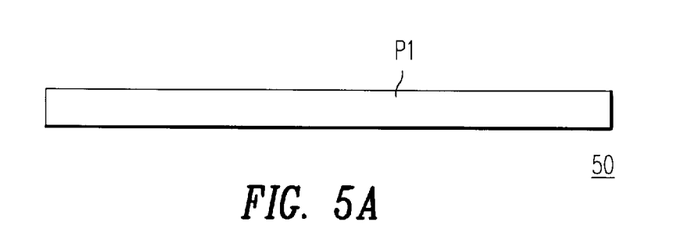
FIGS. 5A–5G are step-by-step cross-sectional views for fabrication of the inductive recording head shown in FIGS. 3A and 3B.

Turning to FIG. 5A, a first magnetic pole layer, typically NiFe, is deposited by using a frame mask to pattern the pole/yoke structure P1, followed by use of a patterned photoresist layer to remove any unwanted NiFe plating by chemical etch.

Figure 5B:
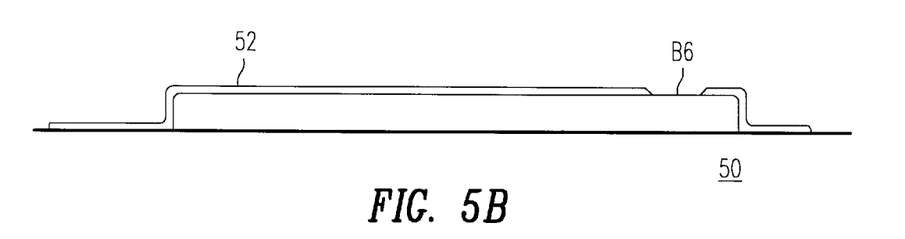

In FIG. 5B, a non-magnetic film 52, typically $Al_2O_3$ is deposited across the surface of the first pole piece P1 to form the gap layer 12 (as shown in FIG. 1). The film is deposited by sputtering or the like to a thickness of 0.1–0.4 $\mu$m. A layer of patternable material, i.e., photoresist, is formed across the surface of the film 52 and patterned to form an opening for a back gap region BG. The exposed firm 52 is chemically etched to expose the pole piece P1 at the back gap region.

Figure 5C:
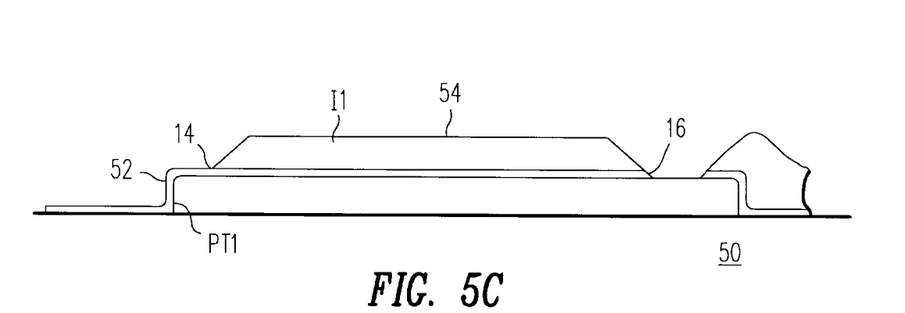

In FIG. 5C, an organic insulating film I1 such as a Novolak-type resin is applied on the film 52 by spin-coating, followed by soft baking, photo patterning and wet-etching in order to form a first insulating film I1 with a flat surface 54. The film I1 has tapered angles at both ends which forms apexes 14 and 16 at a lower pole tip portion PT1 and at the back gap.

Figure 5D:
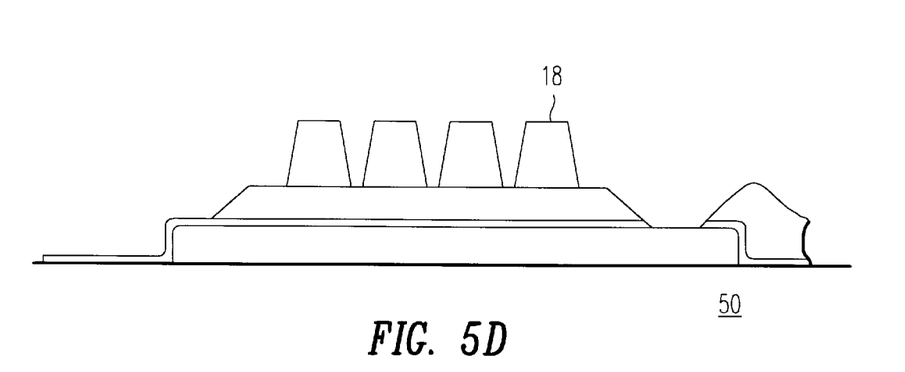

As shown in FIG. 5D, inductive coils 18 are formed on the I1 layer by sputtering or plating over a seed layer of conductive material, typically CrCu or Cu (not shown), disposed on the flat surface 54 of the layer I1.

Figure 5E:
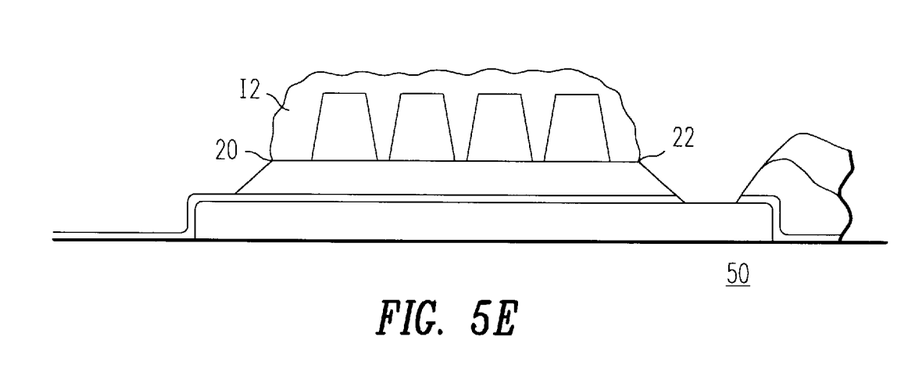

In FIG. 5E, a second insulating layer, I2, is formed using a Novolak photoresist, applied to the coils by spin-coating, followed by curing, photo patterning and wet-etching. The insulating film I2 covers the coils and forms apexes 20 and 22 within the apexes 14 and 16.

Figure 5F:
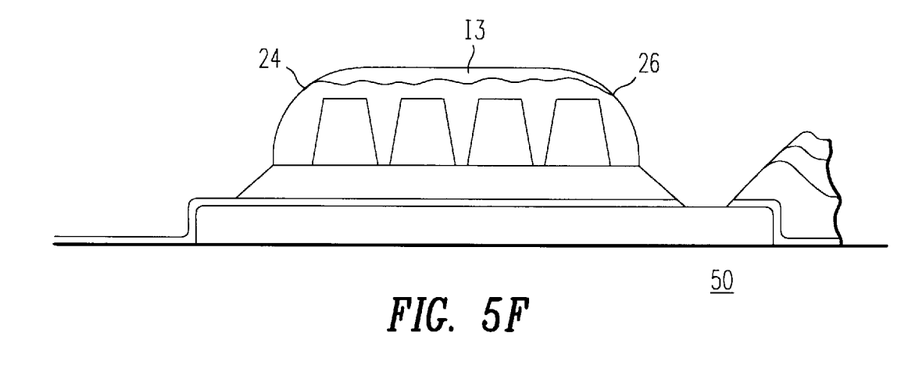

In FIG. 5F, a third insulating layer I3 is formed on the layer I2. The layer I3 is suitably formed by patterning photoresist followed by cross-linking to form apexes 24 and 26 within the apexes 20 and 22. The three insulation layers I1, I2, and I3, form an insulating stack over the head coil or body region of the head to a thickness of approximately 8–10 $\mu$m.

Figure 5G:
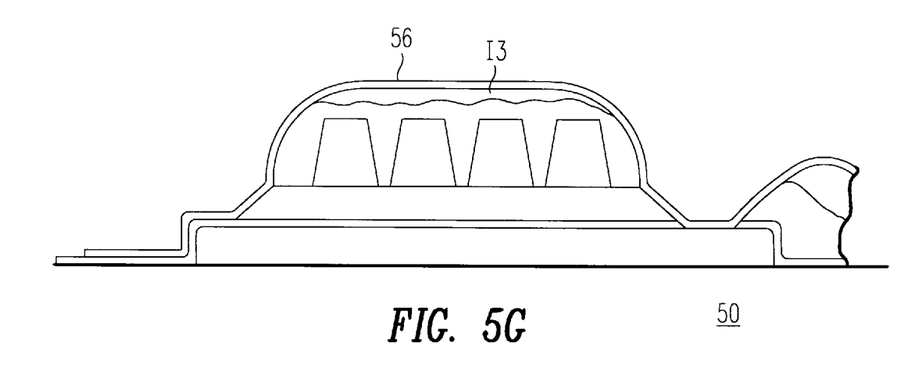

In FIG. 5G, a nickel-iron seed layer 56 is formed over the surfaces of the I3 layer, pole tip region and back-gap region.

Figure 6A:
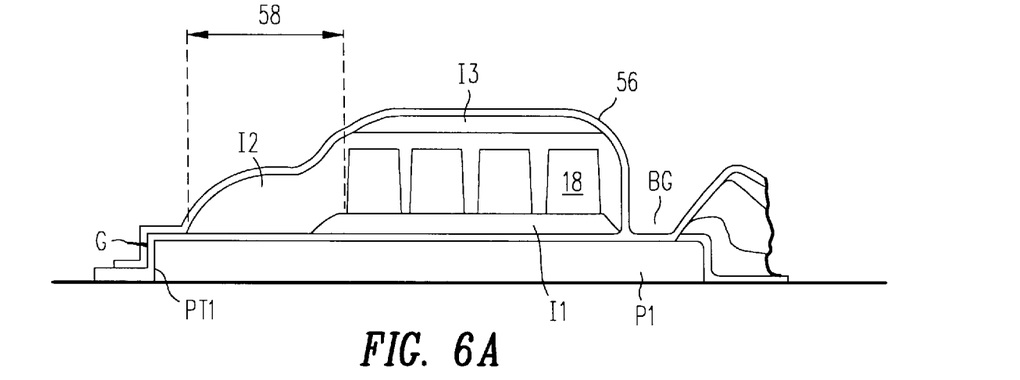
FIG. 6A is a cross-sectional view of a partially completed low profile inductive recording head after seed layer deposition.
Figure 6B:
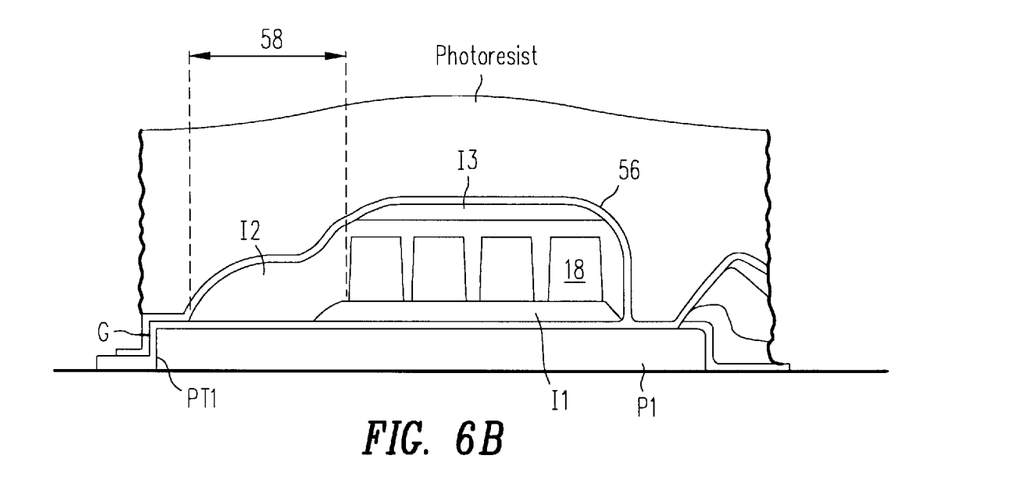
FIG. 6B is a cross-sectional view of a partially completed low profile inductive recording head after photoresist deposition.
Figure 6C:
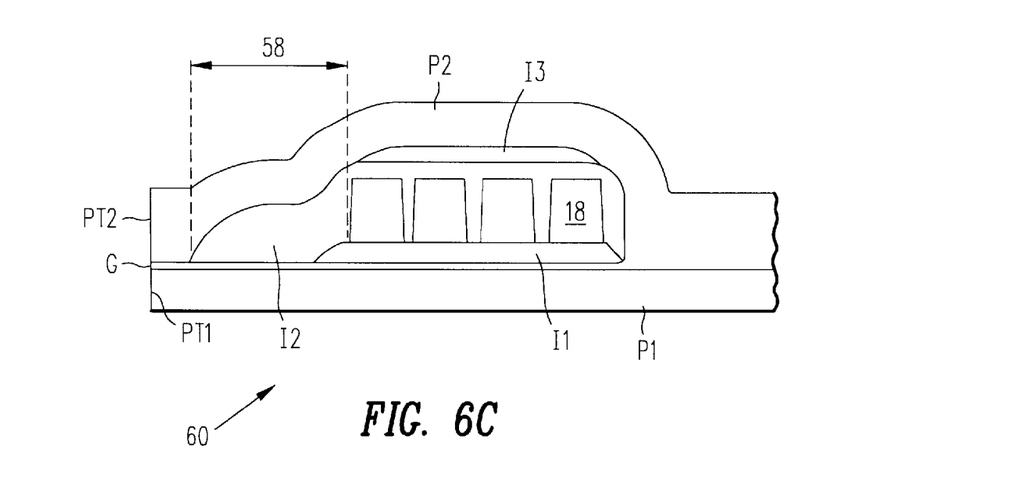
FIG. 6C is a cross sectional view of a low profile recording head 60 after P2 deposition.

Turning briefly to FIGS. 6A–C, as the desired pole tip PT2 width becomes smaller, the required photoresist thickness becomes more difficult to achieve using the conventional or "high profile" head 50 described with reference to FIGS. 5A–5G. A "low profile" head 60 of the type described in the above referenced application Ser. No. 08/296,301 wherein the slope of the front edge and the height of the insulation/coil stack has been significantly reduced is shown (FIG. 6). Basically, the thicknesses of the various insulation layers I1, I2/I3 have been reduced by about half while the height of the coil structure 18 is reduced by about 20 percent. Also, the distance 58 between the head zero throat height and the coil has been increased thus providing a significantly shallower slope from the insulation/coil stack to the zero throat height point. Use of the low profile design along with reduction of the second pole piece plating mask thickness over the head body region allows significantly thinner mask layer thickness in the head pole tip region to be achieved.

After the seed layer deposition, a layer of photoresist is deposited over the seed layer to form the plating frame mask for the second pole piece P2 (as shown in FIG. 2A). The thickness of the photoresist at the pole tip region being in the range of less than 3.6 $\mu$m to 12.0 $\mu$m for pole tip widths of 0.9 $\mu$m to 3.0 $\mu$m to achieve aspect ratios less than 4:1. As described above with reference to FIGS. 2A–2C, the thickness of the photoresist mask layer across the body region is in the range of 1–2 $\mu$m which causes subsequently deposited ferromagnetic material to mushroom over the photoresist mask layer in the yoke region of the head.

When the desired plated thickness for the second pole piece P2 is achieved, the photoresist mask is removed with solvents. The next step is to remove via vacuum sputtering the now exposed seed layer, leaving behind the plated pole/yoke structures. The full thickness of the plated material is contained within the plating mask at the pole tip region providing a well-formed second pole tip PT2. At the yoke region where the thickness of the photoresist mask layer is thinner than the plated thickness, overhanging edges 31 occur as shown in FIG. 4A. As described above with reference to FIGS. 3A, 3A', 3B, 3B', 4A and 4B, the area under the overhanging edges 31 is backfilled with photoresist and cross-linked (i.e., hard-baked) during the magnetic pole piece annealing process. The head is then encapsulated with an insulator material (preferably $Al_2O_3$) which is sputter-deposited onto the entire surface of the head.

As discussed briefly above, an overhanging edge is not desirable at the pole tip PT2 because of the possibility of voids being created under the overhanging edges. Backfilling with hard-baked photoresist under the edges 31 provides a solution to the problem of voids in the head body region 34. However, voids in the pole tip region cannot be backfilled with photoresist because the photoresist would be exposed at the head air bearing surface and may react with lubricant on the storage media disk surface causing severe contamination problems.

While the present invention has been shown in specific embodiments, it is apparent to a worker skilled in the art that various changes and form may be made in the design of the device and the fabrication thereof without departing from the spirit and scope of the invention.

What is claimed is:

1. A method of fabricating a thin film inductive head as a magnetic transducer for high density recording comprising the steps of:

forming a first magnetic element on a substrate including a first pole tip, a first pole piece and a back region having a back gap portion;

forming a gap layer of non-magnetic material on the first magnetic element, the gap layer extending the length of the first magnetic element, excluding the back gap portion;

forming a first insulating layer on the gap layer between the front pole tip and the back gap portion, the first insulating layer sloped toward an apex at the front pole tip and sloped towards an apex at the back gap portion;

disposing conductive materials on the first insulating layer to form coil elements in a body region of the head;

forming a second insulating layer on and enclosing the coil elements;

forming a third insulating layer on the second insulating layer;

forming on the third insulating layer a metallic seed layer for forming a second magnetic element;

forming a layer of photoresist on the metallic seed layer patterned to form a plating frame, the photoresist layer including a continuous opening from a second pole tip region to the first magnetic element back gap portion, the photoresist layer having a greater thickness at the second pole tip region than over the body region, the plating frame having a body portion;

forming a second magnetic element of a ferromagnetic material, the ferromagnetic material being deposited within the continuous opening of the plating frame forming a second pole tip in the second pole tip region, the ferromagnetic material filling and mushrooming over edges of the continuous opening in the body portion of the plating frame forming a magnetic mushroom yoke portion, the mushroom yoke portion having overhanging edges, the second magnetic element including a back gap portion formed over and magnetically coupled to the back gap portion of the first magnetic element;

removing the plating frame and the exposed metallic seed layer; and depositing a fourth insulation layer of non-magnetic insulating material to enclose the second magnetic element in at least the magnetic yoke portion.

2. The method of claim 1 further including the step of annealing the inductive head to crosslink the fourth insulating layer.

3. The method of claim 1 further including the step of backfilling the area under overhanging edges of the mushroom yoke portion with an insulating material.

4. The method of claim 1 wherein the thickness of the photoresist layer at the head body region is selected to have an aspect ratio in the pole tip region of the order less than 4:1.

* * * * *

UNITED STATES PATENT AND TRADEMARK OFFICE
CERTIFICATE OF CORRECTION

PATENT NO.    : 5,901,431
DATED         : May 11, 1999
INVENTOR(S)   : Hugo Alberto Emilio Santini

It is certified that error appears in the above-identified patent and that said Letters Patent is hereby corrected as shown below:

Column 7,
Line 32, delete "firm" and insert -- film --.

Column 8,
Line 1, delete "(FIG. 6)" and insert -- (FIG. 6C) --.

Signed and Sealed this

Thirty-first Day of December, 2002

JAMES E. ROGAN
*Director of the United States Patent and Trademark Office*